(12) United States Patent
Feigl

(10) Patent No.: US 10,087,911 B2
(45) Date of Patent: Oct. 2, 2018

(54) METHODS OF MANUFACTURING AN IMPREGNATED METAL INSERT

(71) Applicant: ALSTOM RENEWABLE TECHNOLOGIES, Grenoble (FR)

(72) Inventor: Luca Feigl, Barcelona (ES)

(73) Assignee: GE Renewable Technologies Wind B.V., Breda (NL)

(*) Notice: Subject to any disclaimer, the term of this patent is extended or adjusted under 35 U.S.C. 154(b) by 317 days.

(21) Appl. No.: 14/777,416

(22) PCT Filed: Mar. 20, 2014

(86) PCT No.: PCT/EP2014/055653
§ 371 (c)(1),
(2) Date: Sep. 15, 2015

(87) PCT Pub. No.: WO2014/147201
PCT Pub. Date: Sep. 25, 2014

(65) Prior Publication Data
US 2016/0047355 A1    Feb. 18, 2016

(30) Foreign Application Priority Data

Mar. 21, 2013 (EP) .................................. 13382102

(51) Int. Cl.
*F03D 1/06*    (2006.01)
*B29C 70/48*    (2006.01)
(Continued)

(52) U.S. Cl.
CPC ............ *F03D 1/0658* (2013.01); *B29C 70/48* (2013.01); *B29C 70/68* (2013.01); *B29C 70/86* (2013.01);
(Continued)

(58) Field of Classification Search
CPC ..... F03D 1/0658; F03D 1/0675; B29C 70/48; B29C 70/68; B29C 70/86; B29C 45/144467; B29D 99/0025
See application file for complete search history.

(56) References Cited

U.S. PATENT DOCUMENTS 4,671,841 A * 6/1987 Stephens ................... B32B 3/12
156/292
4,915,590 A * 4/1990 Eckland ................ F03D 1/0658
29/889.21
(Continued)

FOREIGN PATENT DOCUMENTS

WO    WO 03/057457    7/2003

OTHER PUBLICATIONS

International Search Report and Written Opinion for application No. PCT/EP2014/055653, dated Jun. 4, 2014, 10 pgs.

*Primary Examiner* — Logan Kraft
*Assistant Examiner* — John S Hunter
(74) *Attorney, Agent, or Firm* — Dority & Manning, P.A.

(57) ABSTRACT

Method of manufacturing an impregnated metal insert for a wind turbine blade root, the insert comprising an outer surface and an open end adapted to receive a fastening element for attachment to a wind turbine rotor hub, wherein the method comprises covering the insert outer surface with one or more resin pre impregnated fiber layers, and heating for curing such that a resin impregnated fiber layer adheres to the outer surface of the insert. The disclosure is further related to the method of manufacturing a portion of a wind turbine blade.

7 Claims, 7 Drawing Sheets

(51) Int. Cl.
  B29C 70/68    (2006.01)
  B29D 99/00    (2010.01)
  B29C 70/86    (2006.01)
  B29L 31/08        (2006.01)
  B29K 105/08       (2006.01)
  B29K 705/00       (2006.01)

(52) U.S. Cl.
  CPC ....... B29D 99/0025 (2013.01); F03D 1/0675 (2013.01); *B29K 2105/0872* (2013.01); *B29K 2705/00* (2013.01); *B29L 2031/085* (2013.01); *Y02E 10/721* (2013.01); *Y02P 70/523* (2015.11)

(56) References Cited

U.S. PATENT DOCUMENTS

| | | | |
|---|---|---|---|
| 5,651,848 A * | 7/1997 | Cohee | A42B 3/06 156/93 |
| 7,530,168 B2 * | 5/2009 | Sorensen | B29C 70/86 29/889.21 |
| 7,866,109 B2 * | 1/2011 | Guillot | B64G 1/22 244/131 |
| 2007/0065288 A1 * | 3/2007 | Sorensen | B29C 70/86 416/222 |
| 2009/0114337 A1 | 5/2009 | Llorente et al. | |
| 2012/0207607 A1 * | 8/2012 | Mironov | F03D 1/0658 416/204 R |

\* cited by examiner

METHODS OF MANUFACTURING AN IMPREGNATED METAL INSERT

This application claims the benefit of European Patent Application 13382102.5 filed on Mar. 21, 2013.

The present application relates to methods of manufacturing impregnated metal inserts for wind turbine blade roots. It further relates to methods of manufacturing wind turbine blades comprising such inserts.

BACKGROUND ART

The blades in a wind turbine are typically attached, at a blade root portion, to a rotor hub, either directly or through an extender.

The blades are typically made from composite materials: reinforcing fibres may be bonded to one another with a resin and, subsequently, cured to consolidate. Different kinds of fibres (e.g. glass, carbon, combinations) and resins (e.g. epoxy, polyester, vinyl ester) may be used in different forms (e.g. prepreg, fibre sheets). Such composite materials may not have the structural integrity to provide a secure fixing mechanism into which, for example, threaded bolts may be directly inserted. For this reason, it is known for wind turbine blades to comprise metal inserts or bushings which are embedded into the blade root in a direction parallel to that of the longitudinal axis of the blade. Studs, bolts or rods can thus be used in combination with these bushings to achieve a secure connection between the hub or extender and the blade. Such a connection must be able to withstand all the loads from the blade, i.e. bending moments due to wind pressure and to the weight and rotation of the blades. It is thus desirable for a blade to comprise metal inserts strongly bonded inside the blade root portion.

In general terms considering a structural design of the blades, two main processes are well-known for the manufacturing of composite blades: prepreg and infusion.

Prepreg is the abbreviation for "pre impregnation" and is the process where a fibre layer or fabric is impregnated with a resin to form a homogeneous precursor that is subsequently used to manufacture composite components. Typical curing temperatures for prepreg processes may range between 80° to 120° C. The moulds for prepreg processes should thus be made to withstand such temperature ranges.

In the infusion process, once the fibre layers are distributed, a resin is provided using vacuum and subsequently cured to obtain the composite components. Typical curing temperatures for infusion processes may range between 50° to 70° C. The moulds used for infusion processes may thus be cheaper. Furthermore, the infusion process uses slightly lower performance resins (in terms of strength) due to a low viscosity requirement for facilitating resin infusion. The infusion process is thus usually considered to be a cheaper process. However prepreg processes are normally considered as providing a more accurate fibre alignment, higher performance resins and low void content. Particularly in larger wind turbine blades, the use of prepreg for their manufacturing results in more expensive blades.

A problem related to the manufacture of blades by infusion is the fact that the metal inserts do not adhere too well to a blade root manufactured by infusion. In order to facilitate a proper adhesion between the inserts and the blade root, the inserts are thus usually adapted, e.g. they may comprise a wedge-shaped end for insertion or they may comprise roughness on its external surface. In some cases the inserts may be externally serrated. In some cases the inserts may be made longer than would be necessary to arrange the stud so as to have a larger adhesion surface.

It is thus an object of the present disclosure to provide improved methods of manufacturing wind turbine blades with higher mechanical properties and which are cost-effective.

SUMMARY

In a first aspect a method of manufacturing an impregnated metal insert for a wind turbine blade root is provided. The insert comprises an outer surface and an open end adapted to receive a fastening element for attachment to a wind turbine rotor hub, wherein the method comprises covering the insert outer surface with one or more resin pre impregnated fibre layers, and heating for curing such that a resin impregnated fibre layer adheres to the outer surface of the insert.

All throughout the present description and claims, the terms resin pre impregnated fibre layer, resin impregnated fibre layer or prepreg layer are to be interpreted as a fibre layer or fabric being impregnated with a high viscosity resin thus having a semi-solid resin at room temperature, allowing easy handling, cutting and laying-up into a mould without any transfer or contamination from the resin.

According to this aspect, a metal insert having an outer surface covered with a prepreg layer is thus provided or what is the same, a metal insert that is fully bonded with a prepreg layer. The use of resin pre impregnated fibre layers for covering the metal insert, i.e. the use of a prepreg technique, ensures a high quality bonding between the metal (insert) and the composite material. The impregnated insert is thus a composite component that can be easily transported in chilled conditions as it is quite a small component, especially if compared with a wind turbine blade shell. Furthermore, the impregnated inserts can easily be combinable with other fibre layers using a cheaper technology such as any known infusion technique for the manufacture of a bigger composite structure such as a wind turbine blade shell.

In some embodiments, the method may comprise covering the resin pre impregnated fibre layers with a peel ply layer before curing. The peel ply layer is an easily removable layer that allows free passage of volatiles and resin excess. This way it helps improve the smoothness of the final outer surface of the impregnated insert, i.e. an outer surface of the prepreg layer covering the insert. The adhesion of the impregnated insert to other fibre layers using a cheaper technology is thus improved.

In some embodiments, the method may comprise providing an electrical resistance inside the insert before curing and removing the electrical resistance after curing. The electrical resistance produces heat which facilitates curing.

A further aspect provides a method of manufacturing a portion of a wind turbine blade. The method may comprise providing one or more fibre layers in a mould for forming the blade portion, arranging a plurality of pre impregnated metal inserts obtained by any of the methods substantially as hereinbefore described on top of the fibre layers at a blade root portion of the mould, providing further fibre layers on top of the inserts, introducing a resin in the mould using an infusion technique, and curing the resin such that the pre impregnated inserts are joined to the fibre layers.

According to this aspect a blade portion can be obtained by an infusion technique but with enhanced mechanical properties, at least with respect to the adhesion of the metal inserts embedded within the blade root portion. This also means that the infused resin may be a low viscosity resin and that for storing or shipping the final blade portion no special storage requirements such as a chilled storage are required. It is thus a quite cost-effective process but with improved mechanical properties.

In yet a further aspect impregnated inserts are provided. The inserts may be obtainable by a method substantially as hereinbefore described and may thus comprise an outer surface and an open end adapted to receive a fastening element for attachment to a wind turbine rotor hub, wherein a resin impregnated fibre layer may be adhered to the metal inserts outer surface. Such resulting inserts are substantially small components that can be easily stored and/or shipped under chilled conditions, at least in comparison with e.g. a blade root portion or a blade shell.

In some embodiments, the resin impregnated fibre layer adhered to the outer surface of the insert may have a thickness of less than 3 cm. In others it may even have a thickness of 1 cm or less. This means that with only quite a small amount of high viscosity resin in comparison with e.g. the requirements for the manufacture of a blade root using a prepreg technique, substantially similar adhesion properties are obtained. Moreover, since the resin impregnated fibre layer covering the inserts can be substantially thin (below 3 cm or equal or below 1 cm) little energy is needed to heat it to consolidate with the metal insert. And if a blade root is manufactured by infusion using these impregnated inserts, it would be cheaper than a blade root fully manufactured by prepreg and at the same time, the adhesion of the metal inserts to the fibre layers would be substantially similar.

In some embodiments, the insert may further comprise a closed end opposite to the open end and the closed end may be substantially straight. In some of these embodiments, the insert may be substantially cylindrical and the outer surface may be substantially smooth. This way, machining these types of inserts is quite simple at least in comparison with inserts comprising a wedge-shaped insertion end or inserts comprising a serrated external surface.

A still further aspect provides a wind turbine blade comprising a blade root portion for coupling to a hub or extender of the wind turbine, the blade root portion comprising a plurality of impregnated inserts substantially as hereinbefore described. The inserts being embedded in the blade root portion in a direction parallel to that of a longitudinal axis of the blade. The blade has impregnated metal inserts that are strongly bonded inside the blade root portion as they are covered with a high viscosity resin.

And a further aspect provides a wind turbine comprising at least one blade substantially as hereinbefore described.

Additional objects, advantages and features of embodiments of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 6 shows a top view of a wind turbine blade comprising any of the inserts of FIG. 2a, 3a or 4a.

DETAILED DESCRIPTION OF EMBODIMENTS

Figure 1:
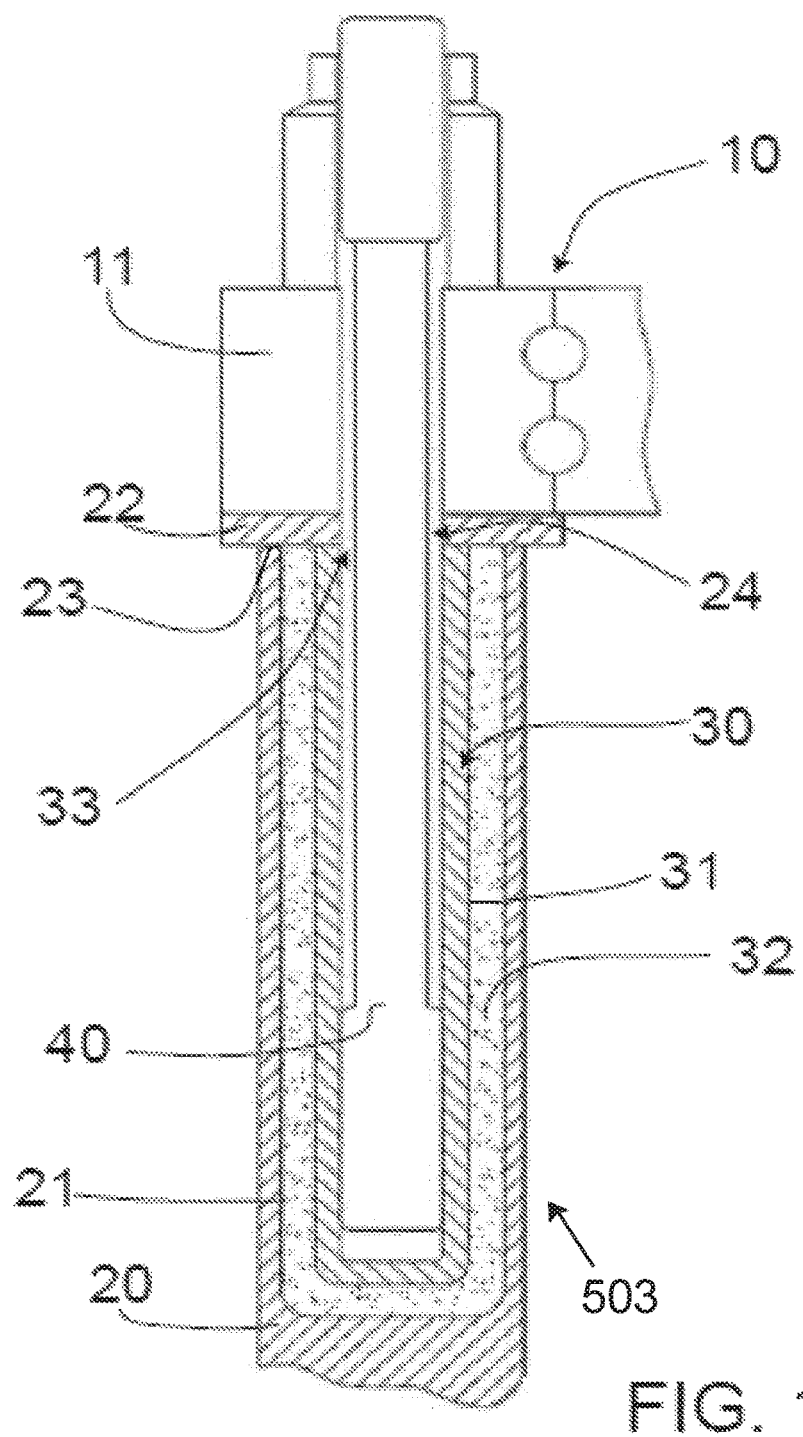
FIG. 1 shows a cross-sectional view of the attachment of a wind turbine blade root portion to a pitch bearing of the wind turbine according to an embodiment.
Figure 7:
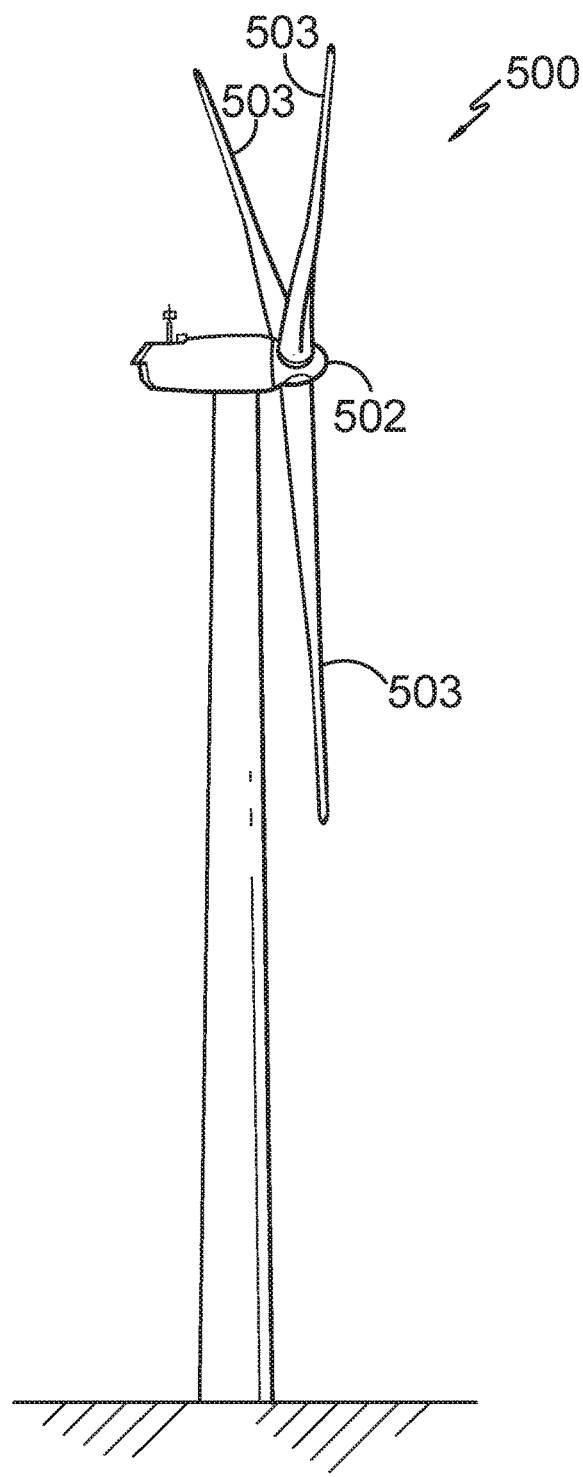
FIG. 7 shows a perspective view of an exemplary wind turbine.

FIG. 1 shows a cross-sectional view of the attachment of a blade 503 to a pitch bearing 10 for attachment to a hub 502 of the wind turbine 500 (FIG. 7). The blade 503 may comprise a blade root portion 20 for coupling to a hub 502 of the wind turbine 500 through the outer ring 11 of the pitch bearing 10. In alternative embodiments, it may be coupled to the inner ring. The blade root may comprise a plurality of holes 21 provided with an internal insert 30. As will be explained for example in connection with FIG. 5, the blade root portion 20 may be made using an infusion technique and the inserts 30 may comprise an outer surface 31 covered by a prepreg layer 32. A mounting flange 22 may further be provided along a periphery of a mounting surface 23 of the blade root. The mounting flange 12 may be provided with holes 24 that may be aligned with an open end 33 of the inserts 30 embedded in the blade root portion 20. This enables insertion of fasteners 40 for securing the blade 503 to the hub 502.

Figure 2A:
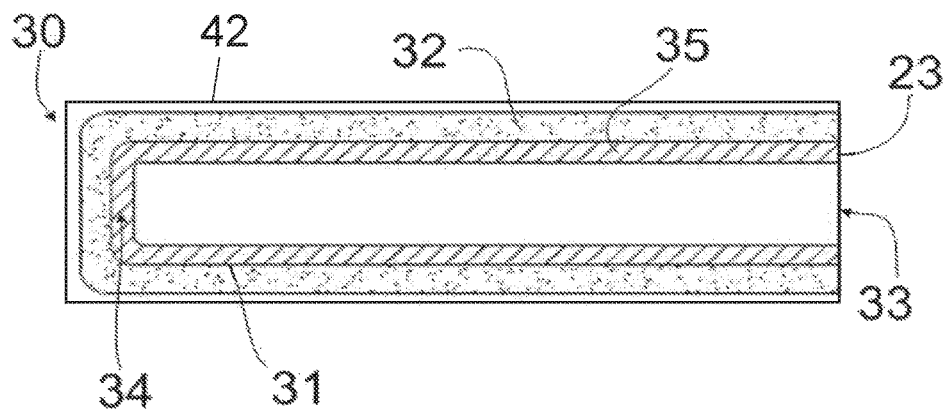
FIGS. 2a, 3a and 4a show cross-sectional views of an impregnated metal insert according to different embodiments.
Figure 3A:
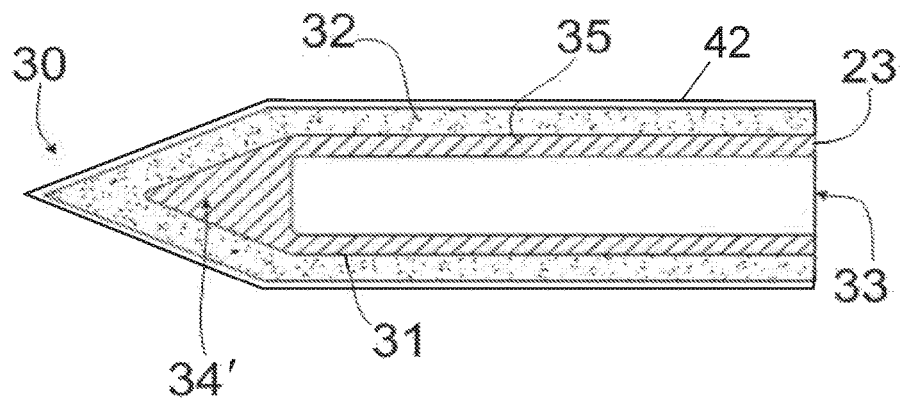
Figure 4A:
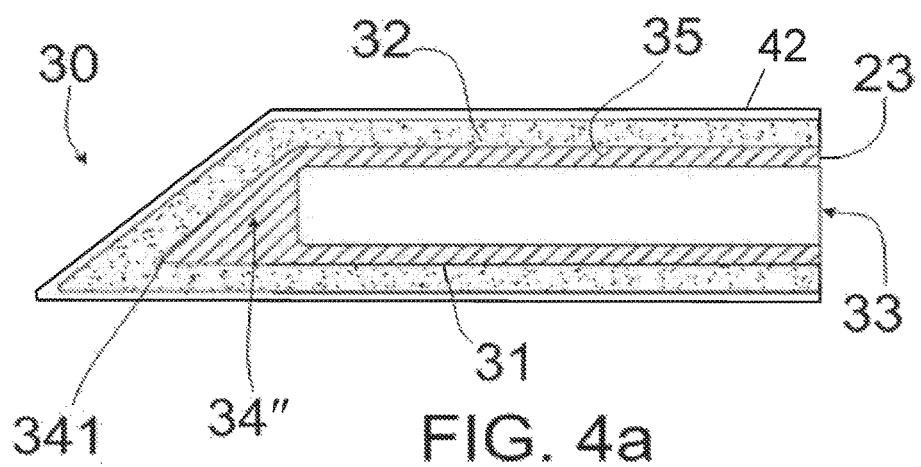

FIGS. 2a, 3a and 4a show cross-sectional views of an impregnated metal insert according to different embodiments. The same reference numbers will be used for matching parts.

The metal insert 30 may comprise a metal core 35 adapted to receive a fastener through an open end 33. The metal core 35 may further comprise an outer surface 31 covered with a prepreg layer 32 i.e. a resin pre impregnated fibre layer may be provided on the outer surface 31 of the metal core 35. The prepreg layer 32 may further be covered with a peel ply layer 42 before the insert core with the resin pre impregnated fibre layer may be cured to consolidate and become an integral composite structure. After curing, the outer surface 31 may be substantially smooth when the peel ply layer 42 is removed, and a closed end 34 of the insert 30, opposite to the open end 33, may the straight shaped. It is thus rather easy to machine.

In alternative embodiments, the closed end may have other shapes. In the examples of FIGS. 3a and 4a the closed ends 34' and 34" may be wedge-shaped. In particular, the closed end 34' of FIG. 3a is arrowhead shaped and the closed end 34" of FIG. 4a has a gradually reducing cross-section to a substantially pointed end 341. These shapes enhance adhesion properties.

Depending on circumstances, in some embodiments, the outer surface may comprise roughness or may be serrated in order to further improve adhesion properties.

Figure 2B:
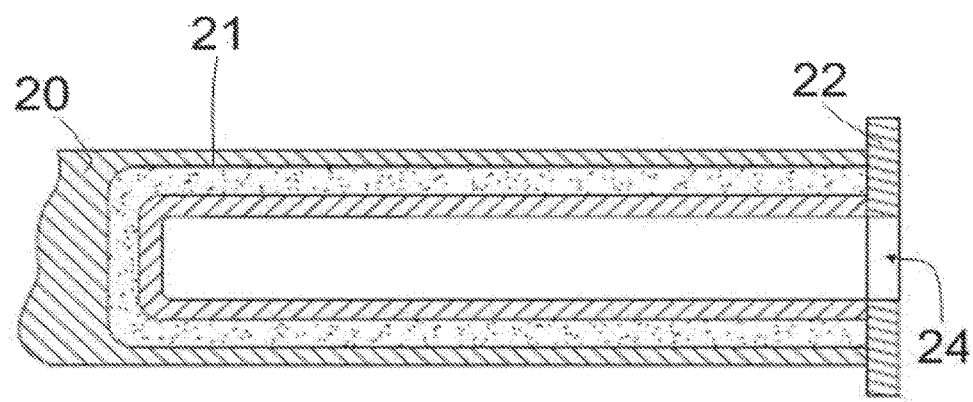
FIGS. 2b, 3b, and 4c show cross-sectional views of the inserts of FIGS. 2a, 2b and 2c respectively embedded into a blade root portion of a wind turbine blade.
Figure 3B:
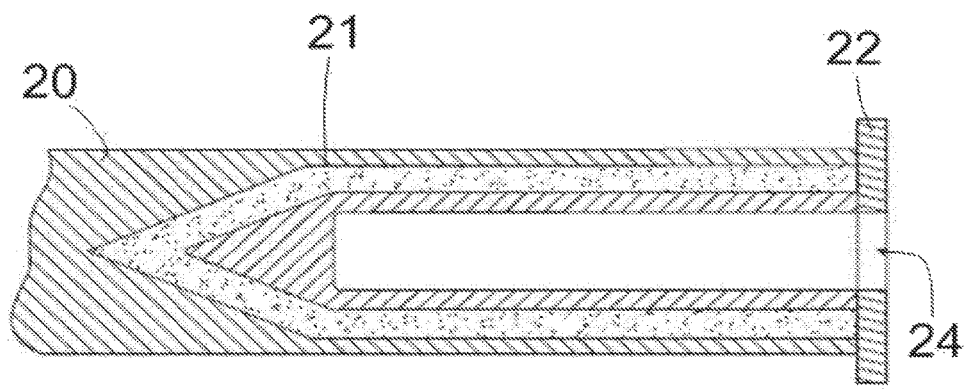
Figure 4B:
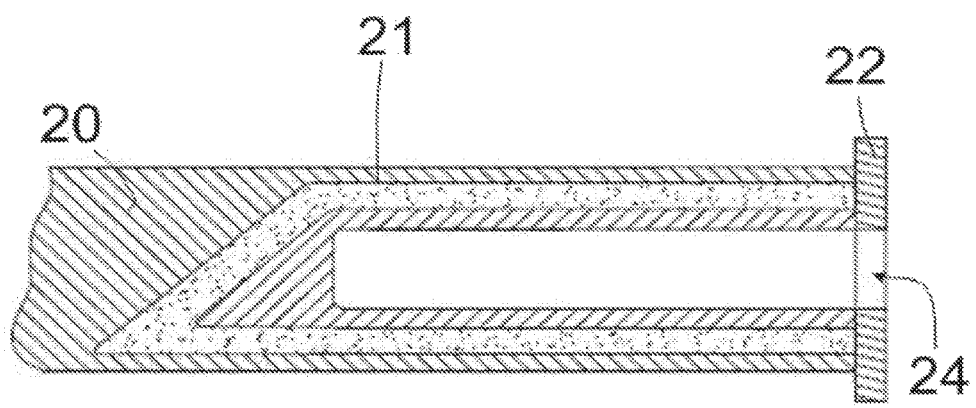

FIGS. 2b, 3b and 4b show cross-sectional views of the inserts 30 of FIGS. 2a, 3a and 4a respectively embedded into a blade root portion 20 of a wind turbine blade.

Figure 5:
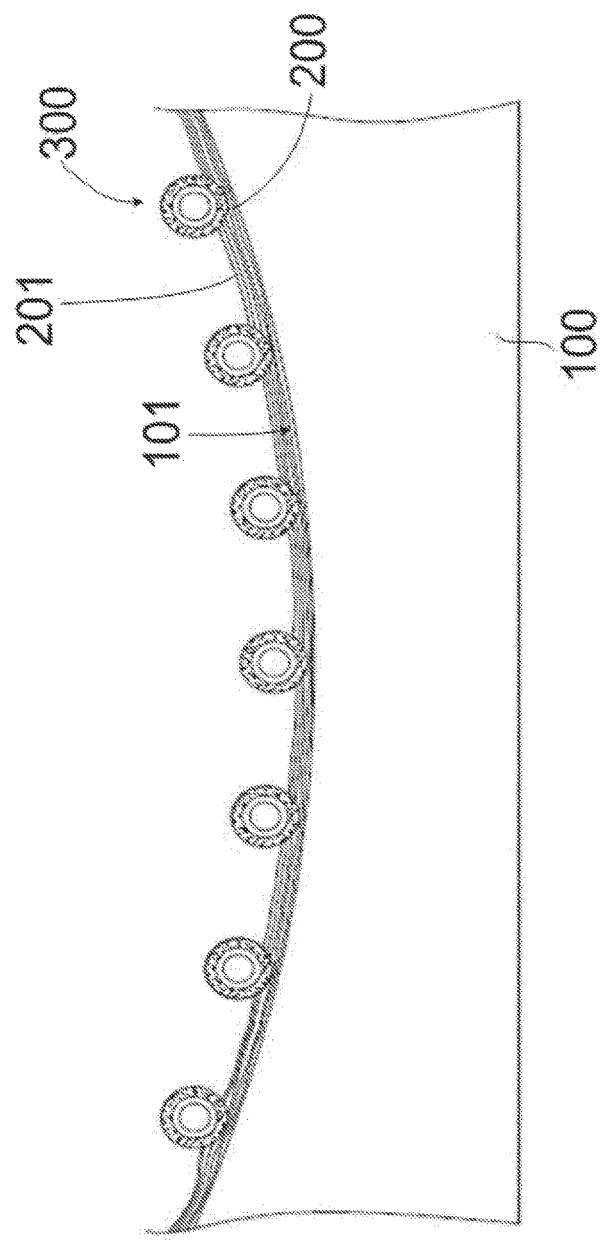
FIG. 5 shows a schematic cross-section of a mould for moulding a blade portion.

FIG. 5 shows a cross-sectional view of a mould 100 that may be used e.g. for infusing a blade shell or a blade root portion of a wind turbine blade using any known infusion technique.

Any known infusion technique may comprise resin transfer moulding (RTM), vacuum assisted resin transfer moulding (VARTM) or RTM light, Seeman's composite resin infusion moulding process (SCRIMP) and resin film infusion among others. The general principle of infusion techniques is to "suck" a resin into the reinforcing fibres and fabrics using a vacuum. The vacuum is used to reduce the pressure at one end of the fabric stack thus allowing atmospheric pressure to force the resin through the fibres.

In FIG. 5 some of the stages of the method of manufacturing a portion of a wind turbine blade have been depicted. In a first stage, a plurality of fibre layers 200 may be distributed on an inner surface 101 of the mould 100. In a second stage, a plurality of pre impregnated inserts 300 may be equidistantly arranged on top of the fibre layers 200 at a blade root portion. And in a third stage further fibre layers 201 may be distributed in between the inserts 300. These further fibre layers 201 may be provided until the inserts 300 are completely covered. In alternative methods, the further layers 201 may be distributed continually on top of the previous fibre layers 200 and on top of the inserts 300.

The method of manufacturing a portion of a wind turbine blade may further comprise the stages of introducing a resin in the mould using an infusion technique i.e. covering the stack of fibre layers with a vacuum bag and "sucking" the resin inside the mould and curing the resin. This way, the pre impregnated inserts are joined together with the fibre layers but with improved mechanical properties with respect to adhesion of the metal inserts because the metal inserts were previously very well adhered to a resin impregnated fibre layer.

The portion of a wind turbine blade provided in accordance with these methods may be e.g. a blade "half", a substantially cylindrical blade root, or a semi-cylindrical half blade root.

Figure 6:
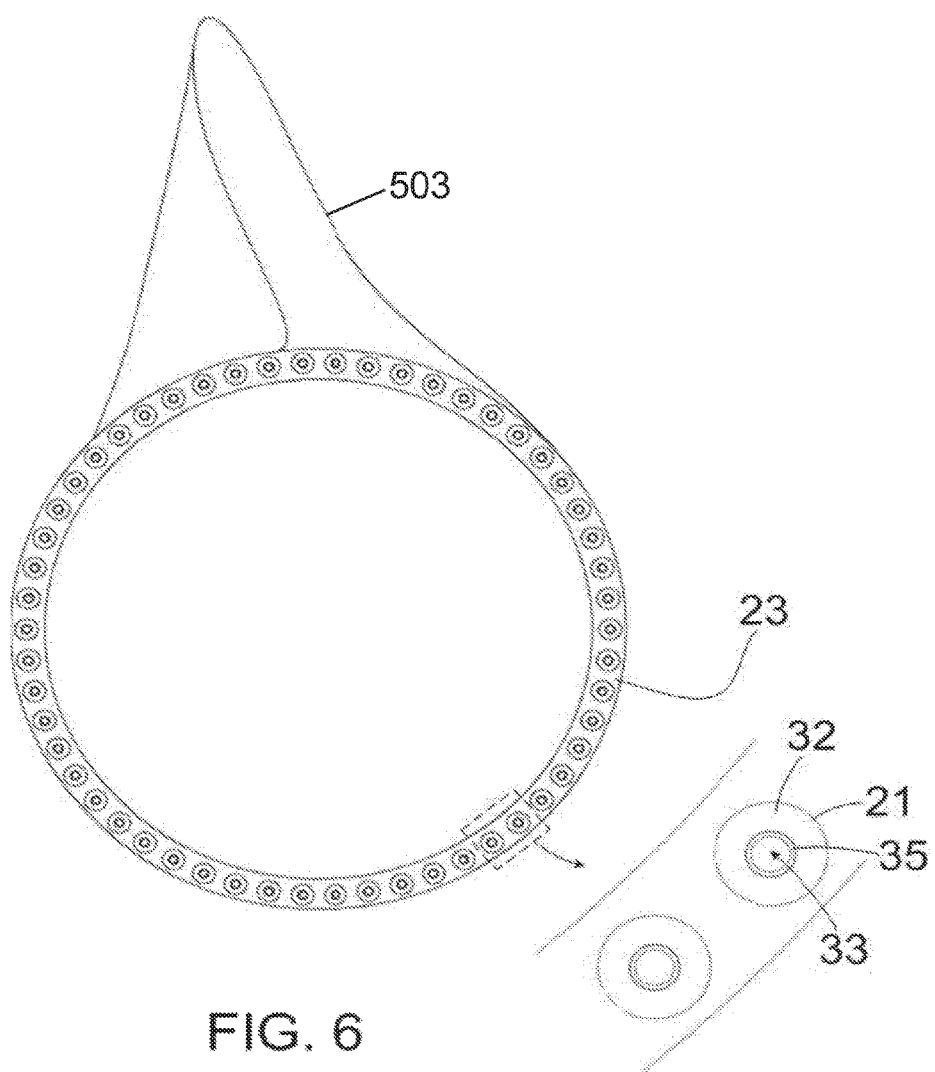

FIG. 6 shows a top view of a wind turbine blade comprising any of the inserts of FIG. 2a, 3a or 4a. FIG. 6 shows the blade root mounting surface 23. An enlarged view of the area enclosed by the dashed lines of FIG. 6 shows that each hole 21 of the blade root may be fitted with a metal insert. Each insert may comprise a metal core 35 adapted to receive a fastener for attachment to the hub of a wind turbine through its open end 33. The metal core 35 may comprise an outer surface that may be fully bonded to a prepreg layer 32 substantially as hereinbefore described.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A method of manufacturing a portion of a wind turbine blade, the method comprising:
   providing one or more fiber layers in a mold for forming the blade portion,
   forming a plurality of pre impregnated metal inserts by
      providing a metal insert comprising an outer surface and an open end adapted to receive a fastener for attachment to a wind turbine rotor hub,
      covering the outer surface of the metal insert with one or more resin pre impregnated fiber layers, and
      heating for curing such that at least one of the resin pre impregnated fiber layers adheres to the outer surface of the metal insert,
   arranging the plurality of pre impregnated metal inserts on top of the fiber layers at a blade root portion of the mold;
   wherein the pre impregnated metal inserts are heated for curing prior to being arranged on top of the fiber layers at the blade root portion of the mold;
   providing further fiber layers on top of the pre impregnated metal inserts,
   infusing a resin into the mold, and
   curing the resin such that the pre impregnated metal inserts are joined to the fiber layers.

2. The method of claim 1, wherein the resin impregnated fiber layer adhered to the outer surface of the pre impregnated metal insert has a thickness in the range of 1 cm to less than 3 cm.

3. The method of claim 1, wherein the step of forming a plurality of pre impregnated metal inserts further comprises heating the metal insert by application of electricity to the metal insert to facilitate curing.

4. The method of claim 1, wherein the pre impregnated metal insert further comprises a closed end opposite to the open end, Wherein the closed end is straight.

5. The method of claim 4, wherein the pre impregnated metal insert is cylindrical.

6. A method of manufacturing a wind turbine blade, the wind turbine blade comprising a blade root portion for coupling to a hub or extender of a wind turbine, the method comprising:
   providing one or more fiber layers in a mold for forming the blade portion,
   forming a plurality of pre impregnated metal inserts by
      providing a metal insert comprising an outer surface and an open end adapted to receive a fastener for attachment to a wind turbine rotor hub,
      covering the outer surface of the metal insert with one or more resin pre impregnated fiber layers, and
      heating for curing such that at least one of the resin pre impregnated fiber layers adheres to the outer surface of the metal insert,
   arranging the plurality of pre impregnated metal inserts on top of the fiber layers at a blade root portion of the mold;
   wherein the pre impregnated metal inserts are heated for curing prior to being arranged on top of the fiber layers at the blade root portion of the mold;
   providing further fiber layers on top of the pre impregnated metal inserts,
   infusing a resin into the mold, and
   curing the resin such that the pre impregnated metal inserts are joined to the fiber layers, wherein the pre impregnated metal inserts are embedded in the blade root portion in a direction parallel to that of a longitudinal axis of the blade.

7. A method of manufacturing a portion of a wind turbine blade, the method comprising:
   providing one or more fiber layers in a mold for forming the blade portion,
   forming a plurality of pre impregnated metal inserts by
      providing a metal insert comprising an outer surface and an open end adapted to receive a fastener for attachment to a wind turbine rotor hub,
      covering the outer surface of the metal insert with one or more resin pre impregnated fiber layers, and
      heating, for curing such that at least one of the resin pre impregnated fiber layers adheres to the outer surface of the metal insert, arranging the plurality of pre impregnated metal inserts on top of the fiber layers at a blade root portion of the mold;
providing further fiber layers on top of the pre impregnated metal inserts,
infusing a resin into the mold,
curing the resin such that the pre impregnated metal inserts are joined to the fiber layers; and
wherein the step of forming a plurality of pre impregnated metal inserts further comprises covering the resin pre impregnated fiber layers with a peel ply layer before heating for curing, and removing the peel ply layer after heating for curing.

\* \* \* \* \*